United States Patent [19]

Yamashita et al.

[11] Patent Number: 5,149,477
[45] Date of Patent: Sep. 22, 1992

[54] PROCESS FOR PRODUCING A RESIN BONDED MAGNET STRUCTURE

[75] Inventors: Fumitoshi Yamashita, Ikoma; Akihiko Watanabe, Kadoma; Masami Wada, Hirakata, all of Japan

[73] Assignee: Matsushita Electric Industrial Co., Ltd., Osaka, Japan

[21] Appl. No.: 840,634

[22] Filed: Feb. 21, 1992

Related U.S. Application Data

[63] Continuation of Ser. No. 665,014, Mar. 5, 1991, abandoned.

[30] Foreign Application Priority Data

Mar. 7, 1990 [JP] Japan .................................. 2-55333

[51] Int. Cl.⁵ .............................................. B29C 43/18
[52] U.S. Cl. ..................................... 264/112; 148/101; 148/105; 252/62.54; 264/122; 264/DIG. 58
[58] Field of Search ............... 264/DIG. 58, 112, 118, 264/122, 117; 148/101, 105; 252/62.54

[56] References Cited

U.S. PATENT DOCUMENTS

| | | | |
|---|---|---|---|
| 4,684,406 | 8/1987 | Matsuura et al. | 75/244 |
| 4,832,891 | 5/1989 | Kass | 264/101 |
| 4,981,635 | 1/1991 | Yamashita et al. | 264/112 |

Primary Examiner—Mary Lynn Theisen
Attorney, Agent, or Firm—Ratner & Prestia

[57] ABSTRACT

A process for producing resin bonded magnet structures is disclosed which includes the steps of: (a) adding a solid epoxy resin of at least one epoxy oligomer and a microcapsule which contains at least one liquid epoxy resin to a melt spun powder of a rare earth element-iron alloy to form a granulated intermediate material, wherein the epoxy oligomer has alcoholic hydroxyl groups in the molecular chain thereof and the solid epoxy resin has a softening temperature (Durran's melting point) of 65° C. to 85° C.; (b) mixing the granulated intermediate material with a powdered curing agent and a lubricant to form a compound; (c) forming a green body of a resin bonded magnet by compressing the compound, and then integrating the green body directly with a supporting member; and (d) curing the solid and liquid epoxy resins in the green body by application of heat to form a rigid structure of the resin bonded magnet integrated with the supporting member.

7 Claims, 2 Drawing Sheets

PROCESS FOR PRODUCING A RESIN BONDED MAGNET STRUCTURE

This application is a continuation of application Ser. No. 07/665,014, filed Mar. 5, 1991, now abandoned.

BACKGROUND OF THE INVENTION

1. Field of the Invention

This invention relates to a process for producing a resin bonded magnet structure, such as one used for a rotor in motors, by the direct formation of a permanent magnet on the outer surface of a supporting member. More particularly, it relates to a process for producing a resin bonded magnet structure by fixing a melt spun powder of a rare earth element-iron alloy with a resin so as to have a bulk-like shape, and then directly integrating the fixed melt spun powder with a supporting member.

2. Description of the Prior Art

A metastable permanent magnetic material can be obtained by ultra-quenching a rare earth element-iron alloy with a melt spinning technique. The resulting permanent magnetic material has a $R_2TM_{14}B$ phase with a grain size of 20 to 400 nm (wherein R is Nd and/or Pr, and TM is Fe and/or Co), and an amorphous phase (R. W. Lee, Appl. Phys. Lett. Vol. 46(8), 15 April (1985), p. 790).

The material is magnetically isotropic and has a relatively high residual induction of, typically, 7.5 kG or more. However, because the permanent magnetic material obtained by a melt spinning technique is a powder in the form of thin ribbon or flake, it must be fixed by a certain method to form a bulk-like permanent resin bonded magnet such as one used in a motor. In general, it is known that the melt spun powder is fixed with a resin to form a bulk-like resin bonded magnet.

The first example of the bulk-like resin bonded magnet applied to motors is a ring-shaped resin bonded magnet with a small diameter, which is used as a rotor in permanent magnet (PM) type step motors for office automation systems. The reason for this application is as follows.

In order to obtain a ring-shaped resin bonded magnet, such as one made of an Sm-Co alloy, having a radial magnetic anisotropy and a high degree of orientation, the ring-shaped resin bonded magnet should be prepared by charging a compound made of Sm-Co alloy powder and resin into a cavity, and then introducing into the cavity a given amount of magnetic fluxes produced by an exciting coil around a yoke. However, in the case of a ring-shaped resin bonded magnet with a smaller diameter, when the magnetic fluxes are introduced into the cavity, a significant amount of magnetomotive forces will be consumed as leakage fluxes because of a smaller diameter of the cavity. Thus, according to this procedure, it is not possible to obtain a higher orientation and therefore the resulting ring-shaped magnet with a smaller diameter cannot be used for producing a high-torque compact motor.

The second example of the bulk-like resin bonded magnet applied to motors is a ring-shaped resin bonded magnet with a relatively large diameter, such as one used in a brushless motor for home appliances with an output power of several watts, in which a sintered ferrite magnet has been widely used so far. In this case, the ring-shaped resin bonded magnet is used as a rotor which passes through an axis and is held by a magnetic supporting member such as laminated cores. The reason for this application is as follows.

For example, the ring-shaped resin bonded magnet structure with a relatively large diameter is produced by the steps of: (1) adding a solid epoxy resin and a microcapsule which contains at least one liquid epoxy resin to a melt spun powder of a rare earth element-iron alloy to form a granulated intermediate material; (2) mixing the granulated intermediate material with a curing agent and a lubricant to form a compound; (3) filling the compound into a cavity in which a magnetic supporting member has been provided; and (4) compressing the compound together with the magnetic supporting member. The resulting ring-shaped resin bonded magnet structure can be used directly as a rotor in brushless motors. Thus, the ring-shaped resin bonded magnet structure with a relatively large diameter has complied with the requirement of a high-torque compact motor, while keeping at least the total cost of motor production from increasing.

In addition to the excellent magnetic properties, a ring-shaped resin bonded magnet with a relatively large diameter has the following advantages: (1) a ring-shaped resin bonded magnet with, for example, an outer diameter of about 50 mm and a thickness of about 1 mm can readily be produced by compressing a compound together with a supporting member at room temperature; (2) because a ring-shaped resin bonded magnet is attached directly to the magnetic supporting member without forming any bonding layer, its permeance coefficient can be improved; (3) a process for bonding a ring-shaped resin bonded magnet with a supporting member can be eliminated; and (4) a process for correcting the rotation balance of a rotor can also be eliminated.

However, in order to further apply a ring-shaped resin bonded magnet to a rotor in various motors for home appliances with a higher output power, e.g., brushless motors for home appliances and servomotors for factory automation systems with an output power of from tens of watts to hundreds of watts, it has been required to solve the following problems: an improvement in the residual induction of resin magnets by densification, and a stabilization of its higher level; an improvement in the integration strength of resin magnets with supporting members, and a stabilization of its higher level; an improvement in the shape flexibility for the formation of resin magnets having different shapes such as a thick ring or a deformed ring; and an achievement of the dimensional precision of resin magnets.

SUMMARY OF THE INVENTION

The process for producing a resin bonded magnet structure of this invention, which overcomes the above-discussed and numerous other disadvantages and deficiencies of the prior art, comprises the steps of: (a) adding a solid epoxy resin of at least one epoxy oligomer and a microcapsule which contains at least one liquid epoxy resin to a melt spun powder of a rare earth element-iron alloy to form a granulated intermediate material, wherein the epoxy oligomer has alcoholic hydroxyl groups in the molecular chain thereof and the solid epoxy resin has a softening temperature (Durran's melting point) of 65° C. to 85° C.; (b) mixing the granulated intermediate material with a powdered curing agent and a lubricant to form a compound; (c) forming a green body of a resin bonded magnet by compressing the compound, and simultaneously integrating the green body with a supporting member; and (d) curing the solid and liquid epoxy resins in the green body by application of heat to form a rigid structure for the resin bonded magnet integrated with the supporting member.

In a preferred embodiment, the aforementioned epoxy oligomer is of the formula:

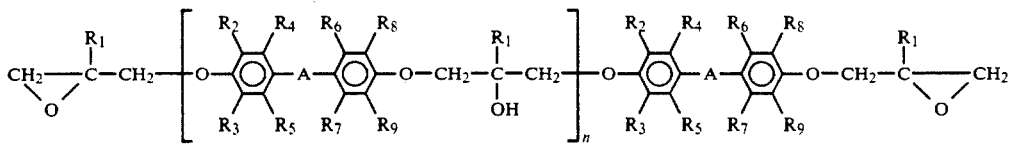

wherein $R_1$ is —H or —$CH_3$; $R_2$ to $R_9$ are independently —H, —Cl, —Br, or —F; A is an alkylene group having 1 to 8 carbon atoms, —S—, —O—, or —$SO_2$—; n indicates a degree of polymerization, and is an integer of 1 or more. In general, epoxy oligomers of this type having a polymerization degree of less than 1 are in the liquid state. However, a mixture of the epoxy oligomers having different degrees of polymerization can also be used, so long as the mixture is in the solid state at room temperature and has a softening temperature (Durran's melting point) of 65° C. to 85° C.

In a preferred embodiment, the aforementioned rare earth element-iron alloy contains 12% to 13% of Nd, 16% to 20% of Co, 4% to 11% of B, and the balance of Fe and impurities, so that a densified resin bonded magnet structure with an improved residual induction can be obtained.

In a preferred embodiment, the aforementioned compound contains 93% to 96% by weight of the melt spun powder, so that a resin bonded magnet having not only an improved strength of integration with a supporting member but also a stable level of the integration strength can be obtained.

In a preferred embodiment, the aforementioned microcapsule which contains at least one liquid epoxy resin is a non-thermosoftening spherical capsule composed substantially of a single cell, so that a resin bonded magnet having not only an improved strength of integration with a supporting member but also a stable level of the integration strength can be obtained.

In a preferred embodiment, the aforementioned powdered curing agent is at least one selected from the group consisting of dicyanodiamide, carboxylic acid dihydrazide, amine, and derivatives thereof.

In a preferred embodiment, the aforementioned lubricant is a fatty acid metallic soap having a higher melting point than the curing temperatures of the epoxy resins, so that a resin bonded magnet having not only an improved strength of integration with a supporting member but also a stable level of the integration strength can be obtained.

In a preferred embodiment, the aforementioned supporting member is a laminate of magnetic steel sheets.

Thus, the invention described herein makes possible the objectives: (1) providing a process for producing a densified resin bonded magnet structure with an improved stable residual induction; (2) providing a process for producing a resin bonded magnet structure with an improved integration strength of the resin bonded magnet with the supporting member; (3) providing a process for producing a resin bonded magnet structure with a shape flexibility for the formation of different shapes, such as a thick ring and a deformed ring; (4) providing a process for producing a resin bonded magnet structure with high dimensional precision; (5) providing a process for producing a resin bonded magnet structure with improved characteristics by selecting a particular solid epoxy resin; (6) providing a process for producing a miniature high-torque resin bonded magnet structure with a small-diameter ring shape, which can be widely used, for example, as a rotor in PM-type step motors for office automation systems; (7) providing a process for producing a resin bonded magnet structure with a relatively large-diameter ring shape, which can be widely used, for example, as a rotor in high-torque compact brushless motors with an output power of several watts for home appliances, thereby keeping the total cost of motor production from increasing; and (8) providing a process for producing a resin bonded magnet structure which can be widely used, for example, as a rotor in brushless motors for home appliance and servomotors for factory automation systems with a higher output power of from tens of watts to hundreds of watts, thereby attaining a considerable expansion of applications.

BRIEF DESCRIPTION OF THE DRAWINGS

This invention may be better understood and its numerous objectives and advantages will become apparent to those skilled in the art by reference to the accompanying drawings as follows.

DESCRIPTION OF THE PREFERRED EMBODIMENT

Figure 1:
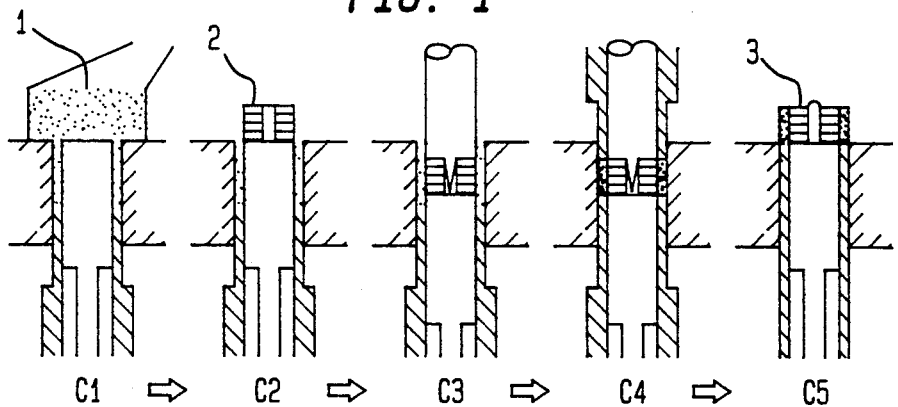
FIG. 1 is a series of schematic views showing the integration step (c) in the production of the resin bonded magnet structure of this invention.

In the method for producing resin bonded magnet structures of the present invention, a granulated intermediate material is first formed by adding a solid epoxy resin of at least one epoxy oligomer and a microcapsule which contains at least one liquid epoxy resin to a melt spun powder of a rare earth element-iron alloy. The epoxy oligomer has alcoholic hydroxyl groups in the molecular chain thereof and the solid epoxy resin has a softening temperature (Durran's melting point) of 65° C. to 85° C.

Examples of the epoxy oligomer having alcoholic hydroxyl groups in the molecular chain thereof which can be used in this invention are those of the glycidyl ether-type represented by the following formula:

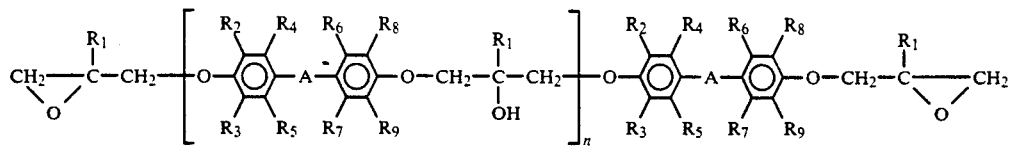

wherein $R_1$ is —H or —$CH_3$; $R_2$ to $R_9$ are independently —H, —Cl, —Br or —F; A is an alkylene group having 1 to 8 carbon atoms, —S—, —O—, or —$SO_2$—; and n indicates a degree of polymerization, and is an integer of 1 or more.

The epoxy oligomer of this type can be obtained by the reaction of epichlorohydrin with a polyhydric phenol. Particularly preferred examples of the polyhydric phenol include resorcinol, and various bisphenols obtained by the reaction of a phenol and an aldehyde or ketone. Typical examples of the bisphenols include bisphenol A which is 2, 2'-bis(p-hydroxylphenyl propane), bisphenol F, bisphenol S, and the like.

The solid epoxy resin may be made of a single epoxy oligomer or may be a mixture of epoxy oligomers having different degrees of polymerization, so long as the resulting epoxy resin is solid, and has alcoholic hydroxyl groups in the molecular chain of any epoxy oligomer, and has a softening temperature (Durran's melting point) of 65° C. to 85° C. The selection of such a solid epoxy resin is concerned with the essential requirements that a resin magnet structure must have (1) an improved stable residual induction by densification; (2) an improved stable integration strength of the resin bonded magnet with the supporting member; (3) a shape flexibility for the formation of different shapes, such as a thick ring and a deformed ring; and (4) a high dimensional precision. When the solid epoxy resin is added to the melt spun powder together with the microcapsules, each of which contains at least one liquid epoxy resin, to form a granulated intermediate material, the solid epoxy resin is used typically at a ratio of 2% by weight or more, preferably about 4% by weight based on the weight of the melt spun powder.

The melt spun powder of a rare earth element-iron alloy which can be used in this invention is a metastable permanent magnetic material having a $R_2TM_{14}B$ phase with a grain size of 20 to 400 nm (wherein R is Nd and/or Pr, and TM is Fe and /or Co), and an amorphous phase. The melt spun powder is prepared by ultra-quenching a rare earth element-iron alloy with a melt spinning technique. Since this material is magnetically isotropic, it is not necessary to give a magnetic anisotropy thereto, when the material is fixed with a resin to form a bulk-like resin bonded magnet. Also, since the material has a relatively high residual induction of, typically, 7.5 kG or more, relatively excellent magnetic properties will be maintained during the formation of the bulk-like resin bonded magnet.

Preferably, the rare earth element-iron alloy contains 12% to 13% of Nd, 16% to 20% of Co, 4% to 11% of B, and the balance of Fe and impurities, because an alloy of this composition exhibits excellent thermal stability determined by a maximum energy product (i.e., $(BH)_{max}$) and a temperature coefficient of residual induction (i.e., $\Delta Br/Br$). Also, the melt spun powder is used in an amount of from 93% to 96% by weight. When more than 96% by weight of the melt spun powder is used, the resulting resin bonded magnet structure will not have a sufficient stable integration strength of the resin bonded magnet with the supporting member. On the other hand, when less than 93% by weight of the melt spun powder is used, the resulting resin bonded magnet structure will not have the desired magnetic properties.

Examples of the microcapsules, each of which contains at least one liquid epoxy resin, are spherical capsules composed substantially of a single cell and having a diameter of from several micrometers to tens of micrometers, which are prepared by an in-situ polymerization process to contain a liquid epoxy resin as an internal material, and a formaldehyde condensation resin as the single cell. The spherical capsule can be dispersed homogeneously in the compound, because it is composed substantially of a single cell. By controlling the crosslinking density of the formaldehyde condensation resin, the cell can be prevented from softening upon being heated and can also have an improved chemical resistance to an organic solvent which is used as a solvent for the solid epoxy resin. Thus, when the microcapsules, each of which contains at least one liquid epoxy resin, are added to the melt spun powder together with the solid epoxy resin, the liquid epoxy resin does not flow out of the cell. Therefore, the amount of the liquid epoxy resin contained in the cell can be increased up to 80% to 90% by weight. Moreover, because the epoxy resin contained in the cell is not polymerized naturally, the compound prepared in the following process has a higher storage stability.

The liquid epoxy resin is used for the purpose of achieving a higher integration strength of the resin bonded magnet structure and maintaining its higher level. This is because the liquid epoxy resin can provide a higher crosslinking density upon being cured, as compared with solid epoxy resins. The form of a microcapsule plays an important role in the integration with a supporting member to ensure the powder fluidity and storage stability due to polymerization inactivity of a compound. Moreover, because a viscous liquid epoxy resin contained in the microcapsule flows out by the mechanical rupture thereof occurring when the compound charged into the cavity of a mold is compressed, it is also possible to decrease the compressive stress and provide an adhesion to the supporting member.

The solid epoxy resin and the microcapsules, each of which contains at least one liquid epoxy resin, are then added to the melt spun powder of a rare earth element-iron alloy to form a granulated intermediate material. The granulated intermediate material is then mixed with a powdered curing agent and lubricant to form a compound.

Examples of the powdered curing agent which can be used in this invention include dicyanodiamide having a latent hardenability and derivatives thereof, various carboxylic acid dihydrazides, amines and derivatives thereof. A mixture of the powdered curing agents can also be used.

A preferred example of the lubricant is a fatty acid metallic soap having a higher melting point than the curing temperatures of the epoxy resins, because the use of such a fatty acid metallic soap can improve the compactibility of the compound. Moreover, the use of such a fatty acid metallic soap can ensure a reliability of the rigid strength by integration of the resin bonded magnet with the supporting member, as well as a higher dimensional precision of the resulting resin bonded magnet structure. In the case of a fatty acid metallic soap having a lower melting point than the curing temperatures of the epoxy resins, it will be melted or vaporized in the heat treatment to integrate the resin bonded magnet with the supporting member by curing the epoxy resins. The melted or vaporized fatty acid metallic soap forms a high concentration layer between the resin bonded magnet and the supporting member. The formation of such a layer leads to a decrease in the reliability of the rigid strength by integration of the resin bonded magnet with the supporting member, as well as a lower dimensional precision.

The compound is then charged into the cavity of a mold, and compressed together with a supporting member to form a green body integrated directly with the supporting member. By the application of pressure, the microcapsules, each of which contains at least one liquid epoxy resin, are ruptured, so that the liquid epoxy resin flows out, and the compound will have a higher fluidity. Also, the liquid epoxy resin which flowed out is useful for providing an adhesiveness between the green body and the supporting member. Then, the green body is heated to cure the epoxy resins (i.e., the solid epoxy resin and the liquid epoxy resin), thereby forming a resin bonded magnet structure. The cured liquid epoxy resin has a higher cross-linking density than that of the cured solid epoxy resin. In general, cured epoxy resins having a higher crosslinking density exhibit a higher strength. Therefore, the liquid epoxy resin gives a higher strength to the resin bonded magnet structure. Also, because the liquid epoxy resin is adhesive, the resulting resin bonded magnet structure has a higher integration strength of the resin bonded magnet with the supporting member.

This invention will be further illustrated by reference to the following examples, but these examples are not intended to restrict the present invention.

EXAMPLES

In the following examples, various resin bonded magnet structures were prepared and examined in various aspects.

The supporting member used herein was a laminate of 22 cores having a shape with an outer diameter of 48 mm and an inner diameter of 8 mm, which are stamped out from magnetic steel sheets 0.5 mm in thickness. With the use of this supporting member, thin ring-shaped resin bonded magnet structures were produced, in each of which a ring-shaped resin bonded magnet with a thickness of 1.10 mm was integrated with the supporting member on the outer surface thereof.

The ingredients used for preparing resin magnets throughout these examples, although explained more specifically in the respective Items below, were basically blended in the following ratio.

| Ingredient | Amount (wt %) |
| --- | --- |
| Solid epoxy resin | 4.0 |
| Melt spun powder of a rare earth element-iron alloy | 93.7 |
| Microcapsules, each of which contains at least one liquid epoxy resin | 1.3 |
| Powdered curing agent | 0.6 |
| Lubricant | 0.4 |

The resin bonded magnet structures were produced as follows: (a) the solid epoxy resin in an appropriate solvent and the microcapsules, each of which contained at least one liquid epoxy resin and had a particle size of 10 to 25 $\mu$m, were added to the melt spun powder having a particle size of 53 to 300 $\mu$m and a thickness of 20 to 30 $\mu$m, and the solvent was removed from the mixture by drying to form a block, which was then ground and sized into a granulated intermediate material having a particle size of 53 to 500 $\mu$m; (b) the granulated intermediate material was mixed with a latent amine-type powdered curing agent having an average particle size of 10 $\mu$m, and a lubricant having an average particle size of 6 $\mu$m to form a compound; (c) while being compressed, the compound was integrated with the supporting member which had been previously heated at temperatures higher than the softening temperature of the solid epoxy resin, thereby directly forming a green body; and (d) the epoxy resins contained in the green body were cured by heating at 120° C. for 20 minutes to form a rigid resin magnetic structure composed of the resin bonded magnet integrated with the supporting member.

FIG. 1 is a series of schematic views showing the integration step (c) in the production of the resin bonded magnet structure. As can be seen from this figure, compound 1 obtained in step (b) is charged into the cavity of a mold (operation C1); magnetic supporting member 2 is placed in the mold (operation C2); supporting member 2 is transferred into the cavity (operation C3); compound 1 is compressed (operation C4); and green body 3 integrated with magnetic supporting member 2 is released from the mold (operation C5).

The integration strength of the resin bonded magnet structure was determined as a shear fracture load obtained when the laminate of magnetic steel sheets used as the supporting member was fixed and a load was uniformly applied to one end face of the resin bonded magnet at a cross-head rate of 10 mm/min. The dimensional precision is determined as a rate of change (expansion) in the outer diameter size of the resin bonded magnet, the rate of change being based on the internal diameter size of the mold used.

Effect of Granulated Intermediate Material

In cases where the solid epoxy resin is not added to the melt spun powder in step (a), a granulated intermediate material cannot be formed. The melt spun powder which was not granulated remains in the form of a thin flake having 20 to 30 $\mu$m thickness. When this melt spun powder is charged into the cavity of a mold in step (c), even though it has a relatively larger particle size of 53 to 300 $\mu$m, it will pass into the clearance between the mold and the molding machine parts, interrupting a smooth continuous operation. The amount of the solid epoxy resin added is preferably at least 2% by weight and more preferably about 4% by weight in order to form a granulated intermediate material, independent of the particle size distribution of the melt spun powder, because most of the melt spun powders have a specific surface area of 0.04 to 0.05 m²/g over a wide range of the particle size distribution. The formation of a melt spun powder into the form of a granulated intermediate material makes possible the continuous repetition of operations C1 to C5 in step (c).

Effect of Softening Temperature of Solid Epoxy Resin

The solid epoxy resin used herein was a mixture of diglycidyl ether type bisphenol A of the formula:

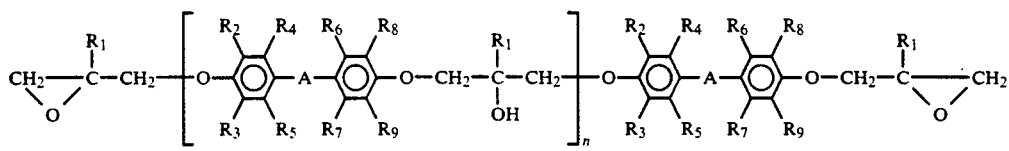

wherein $R_1$ to $R_9$ are —H; A is —C(CH$_3$)$_2$—; and an average of n is in the range of 1.6 to 2.4. This mixture has alcoholic hydroxyl groups in the molecular chain thereof and has a softening temperature (Durran's melting point) of 65° C. to 85° C.

The solid epoxy resin was used in an appropriate solvent. Preferred examples of the solvent are ketone-type solvents such as acetone and methyl ethyl ketone.

Five resin bonded magnet structures were prepared using 4% by weight of five solid epoxy resins having different softening temperatures (i.e., 65° C. to 75° C., 75° C. to 85° C., 95° C. to 105° C., 125° C. to 135° C., and 145° C. to 155° C.) and having alcoholic hydroxyl groups in the molecular chain thereof.

Figure 2:
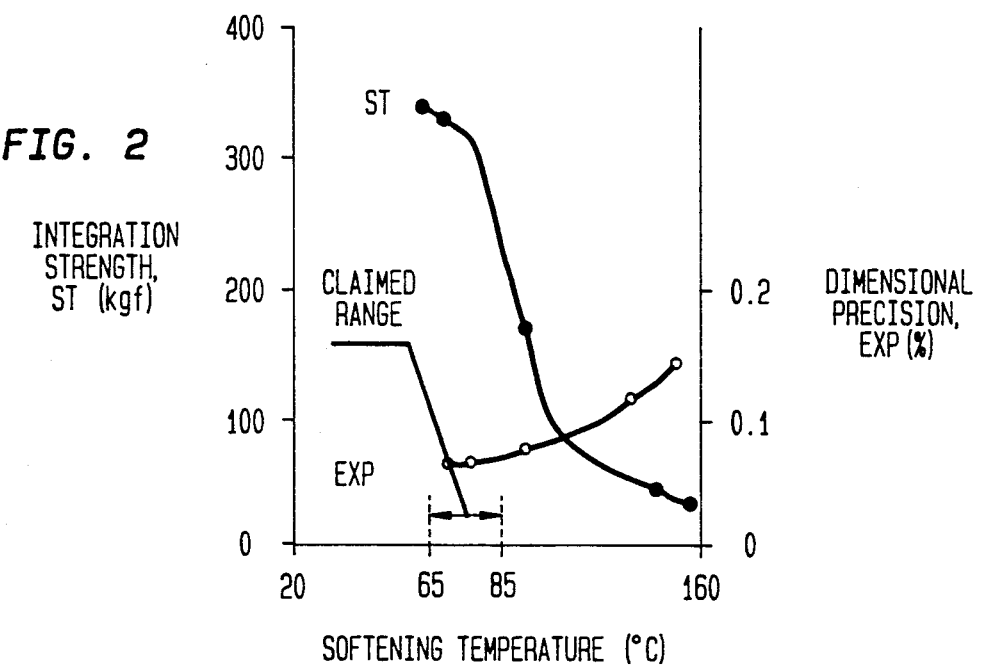
FIG. 2 is a graph showing the relationships between the softening temperature of the solid epoxy resin and the dimensional precision and integration strength of the resin bonded magnet structure.

FIG. 2 is of characteristic curves showing the relationships between the softening temperature of the solid epoxy resin and the integration strength and dimensional precision of the resin bonded magnet structure.

As can be seen from the figure, when the solid epoxy resin having a softening temperature of 65° C. to 85° C. is used, the resin bonded magnet structure obtained has the most excellent integration strength and dimensional precision. When the softening temperature of the solid epoxy resin is less than 65° C., the granulated intermediate material in step (a) and the compound in step (b) cannot be satisfactory prepared from the solid epoxy resin, respectively, because the solid epoxy resin has a tendency to cause blocking at room temperature of about 30° C. In addition, the integration step (c), particularly operation C1, cannot be repeated smoothly and continuously.

Effect of Alcoholic Hydroxyl Group of Solid Epoxy Resin

As a comparative example, a resin bonded magnet structure was prepared in the same manner as described above, except that a novolak-type solid epoxy resin having a softening temperature of 65° C. to 85° C. and composed of epoxy oligomers having no alcoholic hydroxyl groups in the molecular chain thereof was used in place of the solid epoxy resin described above. The resulting resin bonded magnet structure had a dimensional precision of about 0.07% which is the same level as that of the resin bonded magnet structure of this invention. However, even though the novolak-type solid epoxy resin has an epoxy group concentration two to three times that of the solid epoxy resin used in this invention, the integration strength of the resulting resin bonded magnet structure was about 40% decreased down to 190–200 kgf, compared to 340–360 kgf of the resin bonded magnet structure of this invention. This is because the solid epoxy resin of epoxy oligomers having alcoholic hydroxyl groups in the molecular chain thereof provides an enhanced adhesion to the supporting member (i.e., the laminate of magnetic steel sheets) because of its polarity. The enhanced adhesion may ensure satisfactory handling of the integrated green body in the production process of from step (c), particularly operation C5, to step (d).

Effect of Alloy Composition of Melt Spun Powder

As a comparative example, a resin bonded magnet structure was prepared in the same manner as described above, except that a melt spun powder of a rare earth element-iron alloy containing 12% to 13% of Nd, 6% of B, and the balance of Fe (not containing Co), was used in place of the melt spun powder of a rare earth element-iron alloy containing 12% to 13% of Nd, 16% to 20% of Co, 6% of B, and the balance of Fe.

Figure 3:
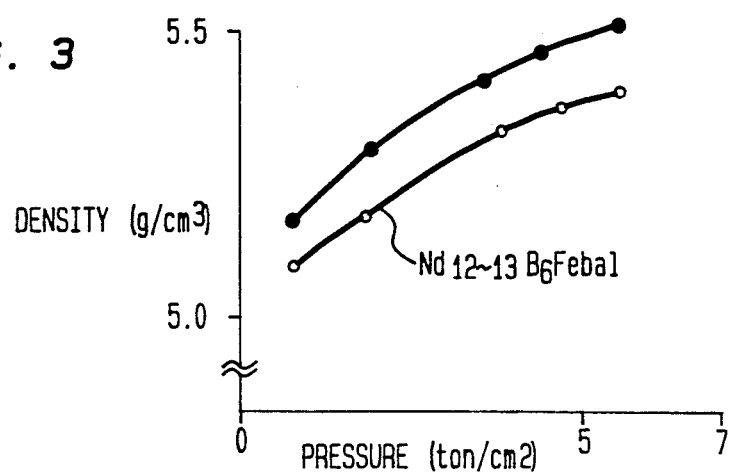
FIG. 3 is a graph showing the relationships between the pressure applied for compression in operation C4 and the density of the resin bonded magnet.

FIG. 3 is of characteristic curves showing the relationship between the pressure applied for compression in operation C4 and the density of the resin bonded magnet obtained.

As can be seen from this figure, when the melt spun powder of a rare earth element-iron alloy in which a part of Fe is substituted by Co is used, the density of the resin bonded magnet obtained is increased due to its higher compressibility. This is because the melt spun powder with a partial substitution of Co for Fe can readily be destroyed mechanically by the pressure applied for compression, thereby enhancing a densification of the resin bonded magnet. Moreover, in the case of the melt spun powder of a rare earth element-iron alloy containing 16% to 20% of Co substituted for a part of Fe, the ΔBr/Br value of the resin bonded magnet obtained is changed from −0.12%/°C. to −0.07%/°C. (where the absolute value thereof is decreased). Therefore, the partial substitution of Co for Fe is effective not only for an increase in the amount of magnetic flux caused by the densification of the resin bonded magnet, but also for an improvement in the thermal stability of magnetic properties and in the mechanical strength.

Effect of Melt Spinning Powder Amount

Figure 4:
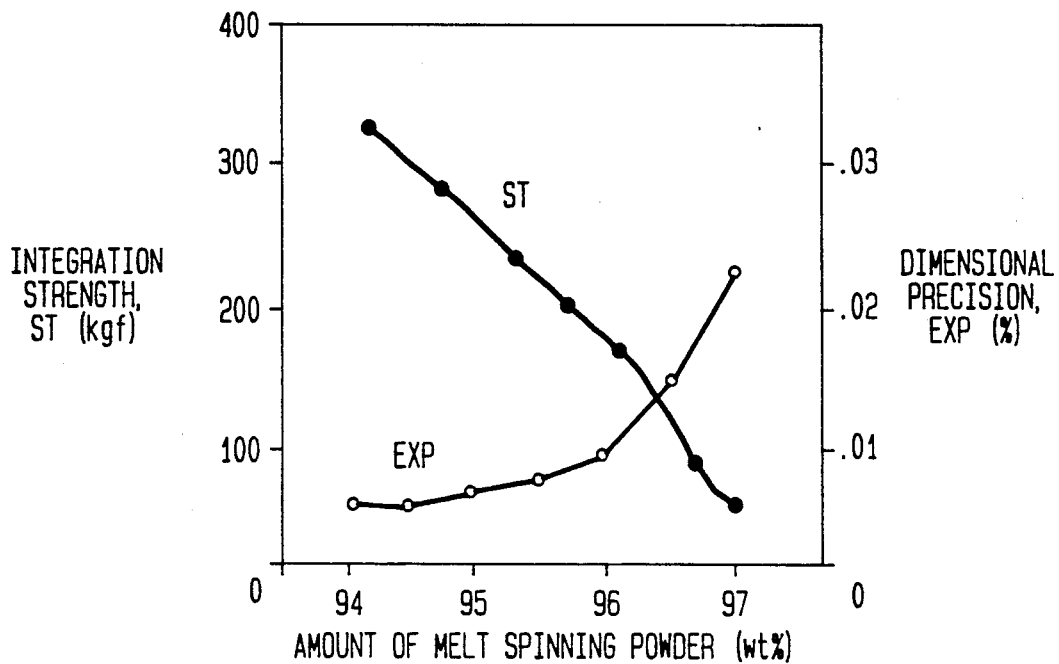
FIG. 4 is a graph showing the relationships between the amount of melt spun powder and the dimensional precision and integration strength of the resin bonded magnet structure.

FIG. 4 is of characteristic curves showing the relationships between the amount of melt spun powder and the dimensional precision and integration strength of the resin bonded magnet structure.

As can be seen from this figure, when the amount of melt spun powder is 96% by weight or less, it is possible to ensure both the dimensional precision of 0.10% or less and the integration strength of 200 kgf or more. However, when the amount of melt spun powder is decreased from 95% by weight, the dimensional precision is not more significantly increased, and the amount of magnetic flux is decreased. Therefore, the amount of melt spun powder is preferably set in the range of from 93% to 96% by weight.

Effect of Microcapsules, Each of Which Contains at Least One Liquid Epoxy Resin The liquid epoxy resin used herein was a multifuctional novolak-type epoxy resin of the formula:

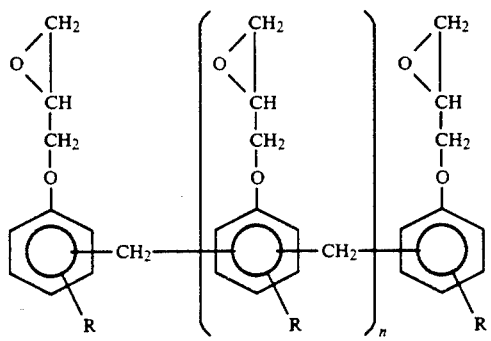

wherein R is —H, and n indicates a degree of polymerization and is more than 1. The liquid epoxy resin has a viscosity of 14 to 20 poise (at 52° C.) and has an epoxy equivalent of 172 to 179. In general, the novolak-type epoxy resin has a smaller epoxy equivalent than that of the glycidyl ether type epoxy resin, so that a higher crosslinking density based on the oxirane rings can be obtained. This feature contributes to an improvement in the integration strength of the resin bonded magnet structure according to this invention.

The microcapsules, each of which contains at least one liquid epoxy resin, are non-thermosoftening spherical capsules composed substantially of a single cell. The spherical capsules are prepared from, for example, a formaldehyde condensation resin. When the condensation degree of a formaldehyde condensation resin is reduced, the spherical capsules capable of being softened at 90° C. to 100° C. can be formed. These thermosoftening spherical capsules can readily be attacked by an organic solvent used in dissolving the solid epoxy resin in step (a). Thus, the liquid epoxy resin contained in the spherical capsules flows out, thereby causing a difficulty in charging the compound in step (c), particularly operation C1. Also, when the resin bonded magnet structure prepared from such microcapsules, each of which contains at least one liquid epoxy resin, is allowed to stand at 120° C. for 100 hours, the dimensional precision after this treatment will be decreased by a factor of ten, as compared with the resin bonded magnet structure prepared from the microcapsules, each of which contains at least one liquid epoxy resin and is composed substantially of a single cell, wherein the latter resin bonded magnet structure exhibits a dimensional precision of 0.01% or less.

On the other hand, when the microcapsules, each of which contains at least one liquid epoxy resin and is composed of two or more cells, are used, it can readily be ruptured by mechanical forces because of an increase in the particle size. Therefore, the liquid epoxy resin contained in the spherical capsules flows out in steps (a) and (b) as described above, thereby causing a difficulty in charging the compound in step (c), particularly operation C1.

Effect of Lubricant

The presence of lubricant is effective for repeating the operations of step (c) smoothly and continuously in the process of this invention.

Figure 5:
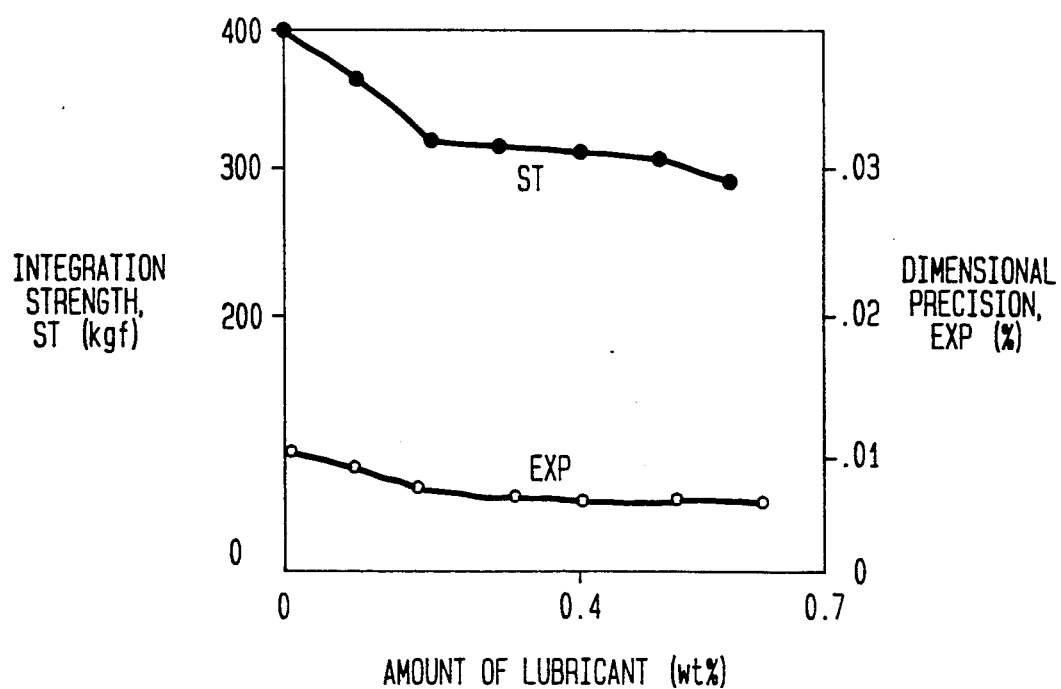
FIG. 5 is a graph showing the relationships between the amount of lubricant and the dimensional precision and integration strength of the resin bonded magnet structure.

FIG. 5 is of characteristic curves showing the relationships between the amount of lubricant and the dimensional precision and integration strength of the resin bonded magnet structure obtained when calcium stearate having a melting point of about 180° C. is used as the lubricant. With an increase in the amount of lubricant, the dimensional precision is increased, whereas the integration strength is decreased. The amount of lubricant used is typically 0.2% by weight or more, preferably 0.4% by weight for the purpose of ensuring a higher dimensional precision.

On the other hand, when stearic acid and various metallic soaps having different melting points are used as a lubricant in an amount of 0.4% by weight based on the weight of the compound, the integration strength of the resin bonded magnet structure has a tendency to decrease with a decrease in the melting point of the lubricant. Particularly, when a lubricant having a lower melting point than the curing temperatures of the epoxy resins is used, the integration strength of the resin bonded magnet structure is significantly reduced. This is because the lubricant is melted or vaporized when the epoxy resins are cured in step (d), and the melted or vapored lubricant forms a high concentration layer between the resin bonded magnet and the supporting member, which causes a decrease both in the dimensional precision of the resin bonded magnet structure and in the rigid strength of the green body integrated with the supporting member.

It is understood that various other modification will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A process for producing a resin bonded magnet structure, comprising the steps of:
   (a) adding a solid epoxy resin of at least one epoxy oligomer and microcapsules, prepared from a formaldehyde condensation resin, which contain at least one liquid epoxy resin to a melt spun powder of a rare earth element-iron alloy to form a granulated intermediate material, wherein said epoxy oligomer has alcoholic hydroxyl groups in the molecular chain thereof and said solid epoxy resin has a softening temperature (Durran's melting point) of 65° C. to 85° C.;
   (b) mixing said granulated intermediate material with a powdered curing agent and a lubricant to form a compound wherein said compound contains 93% to 96% by weight of said melt spun powder;
   (c) forming a green body of a resin bonded magnet by compressing said compound, and simultaneously integrating said green body with a supporting member; and
   (d) curing said solid and liquid epoxy resins in said green body by application of heat to form a rigid structure of said resin bonded magnet integrated with said supporting member.

2. A process for producing a resin bonded magnet structure according to claim 1, wherein said epoxy oligomer is of the formula:

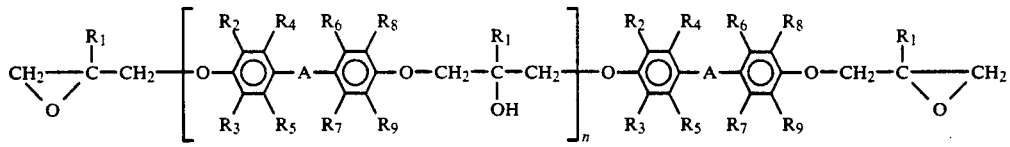

wherein $R_1$ is —H or —$CH_3$; $R_2$ to $R_9$ are independently —H, —Cl, —Br, or —F; A is an alkylene group having 1 to 8 carbon atoms, —S—, —O—, or —$SO_2$—; n indicates a degree of polymerization, and is an integer of 1 or more.

3. A process for producing a resin bonded magnet structure according to claim 1, wherein said rare earth element-iron alloy contains 12% to 13% of Nd, 16% to 20% of Co, 4% to 11% of B, and the balance of Fe and impurities.

4. A process for producing a resin bonded magnet structure according to claim 1, wherein said microcapsule which contains at least one liquid epoxy resin is nonthermosoftening spherical capsule composed substantially of a single cell.

5. A process for producing a resin bonded magnet structure according to claim 1, wherein said powdered curing agent is at least one selected from the group consisting of dicyanodiamide, carboxylic acid dihydrazide, amine, and derivatives thereof.

6. A process for producing a resin bonded magnet structure according to claim 1, wherein said lubricant is a fatty acid metallic soap having a higher melting point than the curing temperatures of said epoxy resins.

7. A process for producing a resin bonded magnet structure according to claim 1, wherein said supporting member is a laminate of magnetic steel sheets.

* * * * *

UNITED STATES PATENT AND TRADEMARK OFFICE
CERTIFICATE OF CORRECTION

PATENT NO. : 5,149,477
DATED : September 22, 1992
INVENTOR(S) : Fumitoshi Yamashita, Akihiko Watanabe and Masami Wada It is certified that error appears in the above-indentified patent and that said Letters Patent is hereby corrected as shown below:

On the title page:

Item    (56) - Add - To the References Cited.

-- FOREIGN PATENT DOCUMENTS
0 155 082    2/12/85    European Patent Office
0 125 752    3/6/84     European Patent Office

OTHER PUBLICATIONS

R. W. Lee, "Hot-Pressed Neodymium-Iron-Boron Magnets", Appl. Phys. Lett. Vol. 46(8); 4/15/85, pp. 790-791    --

Signed and Sealed this

Twenty-sixth Day of October, 1993

Attest:

BRUCE LEHMAN

*Attesting Officer*    *Commissioner of Patents and Trademarks*